US012559415B2

(12) United States Patent
Choi et al.

(10) Patent No.: US 12,559,415 B2
(45) Date of Patent: **\*Feb. 24, 2026**

(54) LOW-TEMPERATURE FIRED, LEAD-FREE GLASS FRIT, PASTE, AND VACUUM GLASS ASSEMBLY USING SAME

(71) Applicant: LG ELECTRONICS INC., Seoul (KR)

(72) Inventors: Wongyu Choi, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,431

(22) Filed: Mar. 12, 2024

(65) Prior Publication Data

US 2024/0217865 A1     Jul. 4, 2024

Related U.S. Application Data

(62) Division of application No. 16/970,073, filed as application No. PCT/KR2018/004616 on Apr. 20, 2018, now Pat. No. 11,958,772.

(30) Foreign Application Priority Data

Feb. 23, 2018   (KR) ........................ 10-2018-0022131
Feb. 23, 2018   (KR) ........................ 10-2018-0022132

(51) Int. Cl.
| | |
|---|---|
| *C03C 8/08* | (2006.01) |
| *C03B 23/24* | (2006.01) |
| *C03C 8/16* | (2006.01) |
| *C03C 8/24* | (2006.01) |

(52) U.S. Cl.
CPC ................ *C03C 8/08* (2013.01); *C03B 23/24* (2013.01); *C03C 8/16* (2013.01); *C03C 8/24* (2013.01)

(58) Field of Classification Search
CPC .... C03C 8/08; C03C 8/16; C03C 8/24; C03B 23/24
See application file for complete search history.

(56) References Cited

U.S. PATENT DOCUMENTS

| | | | | |
|---|---|---|---|---|
| 5,245,492 | A | * | 9/1993 | Mizuno ................... C03C 8/245 501/51 |
| 11,597,675 | B2 | * | 3/2023 | Choi ....................... C03C 3/122 |
| 2016/0322597 | A1 | * | 11/2016 | Gong ................. H10K 50/8426 |

FOREIGN PATENT DOCUMENTS

| | | | | |
|---|---|---|---|---|
| JP | 2012106891 A | * | 6/2012 | ............... C03C 3/21 |

OTHER PUBLICATIONS

JP2012106891A machine translation (Year: 2012).*
Zirconium phosphate ChemBK https://www.chembk.com/en/chem/alpha-Zirconium%20phosphate Accessed Sep. 16, 2024 (Year: 2024).*

* cited by examiner

*Primary Examiner* — Cameron K Miller
(74) *Attorney, Agent, or Firm* — KED & ASSOCIATES, LLP

(57) ABSTRACT

A glass frit according to this application may include a composition of $P_2O_5$, $V_2O_5$, $TeO_2$, CuO, ZnO, and BaO configured to replace a conventional lead glass composition and enable a low temperature calcination. A coefficient of thermal expansion (CTE) of the glass frit may be matched with that of a glass substrate. The composition may not include an inorganic filler or at least reduce a content of an inorganic filler to reduce or prevent separation and breakage and to improve durability. The glass frit may be used as a paste for a vacuum glass assembly.

6 Claims, No Drawings

LOW-TEMPERATURE FIRED, LEAD-FREE GLASS FRIT, PASTE, AND VACUUM GLASS ASSEMBLY USING SAME

CROSS-REFERENCE TO RELATED APPLICATIONS

This application is a Divisional Application of U.S. patent application Ser. No. 16/970,073 filed Aug. 14, 2020, which is a U.S. National Stage Application under 35 U.S.C. § 371 of PCT Application No. PCT/PCT/KR2018/004616, filed Apr. 20, 2018, which claims priority to Korean Patent Application Nos. 10-2018-0022131 and 10-2018-0022132, both filed Feb. 23, 2018, whose entire disclosures are hereby incorporated by reference.

BACKGROUND

1. Field

This application relates to a lead-free low temperature calcined glass frit, paste, and a vacuum glass assembly using the same.

2. Background

In a glass window, a home appliance, or an electrical and electronic component, etc., (such as a vacuum insulation multi-layer glass panel, a display panel, or an organic EL display panel), a sealing or an attachment, etc., is made by a glass frit including an inorganic ceramics particle and a glass composition. Such a sealing glass frit is generally applied in a form of paste and such a glass paste is applied to glass by using a screen printing method or a dispenser method, etc., followed by drying and calcination to give a sealing function.

A lead (II) oxide-diboron trioxide $PbO—B_2O_3$, or lead borate, based glass composition including a very large amount of lead oxide has been widely used. The $PbO—B_2O_3$-based glass composition has a softening point of about 400 to 450° C. and shows a good softening fluidity and a relatively high chemical stability.

However, in recent years, concern for the environment is growing, and a safer material is being demanded. For example, in Europe, a Directive (RoHS Directive) by the European Union (EU) restricting the use of certain hazardous substances in electrical and electronic equipment came into force on Jul. 1, 2006. In the RoHS Directive, a total of six substances, including lead, were designated as a prohibited substance.

Since the $PbO—B_2O_3$-based glass composition includes a lot of lead, which is a prohibited substance under the RoHS Directive, it is difficult to use the composition as a sealing glass paste. Accordingly, there is a need to develop a novel glass composition that does not include lead. Further, to reduce a thermal damage and improve a productivity of various glass sealing parts and electrical and electronic components, there is a need to develop a lead-free glass composition that is capable of softening enough to flow at a low temperature and that has good chemical stability compared to the $PbO—B_2O_3$-based glass composition.

A phosphorus pentoxide-vanadium pentoxide-tellurium dioxide ($P_2O_5—V_2O_5—TeO_2$) based lead-free glass composition is a lead-free glass composition that can be calcined at a low temperature.

However, the $P_2O_5—V_2O_5—TeO_2$-based glass composition has an increased tendency to crystallize during calcination, so that it cannot obtain good softening fluidity.

In addition, even if such a $P_2O_5—V_2O_5—TeO_2$-based lead-free glass composition could be calcined at a low temperature, a coefficient of thermal expansion of the $P_2O_5—V_2O_5—TeO_2$ based lead-free glass composition is not matched with that of a glass substrate such that separation or breakage may occur. In order to lower the coefficient of thermal expansion, a unit cost of a product using the composition is increased due to use of a lot of inorganic fillers.

Further, a silver(I) oxide-vanadium pentoxide-tellurium dioxide ($Ag_2O—V_2O_5—TeO_2$) based lead-free glass composition is a lead-free based glass composition that does not include lead and is capable of calcination at the low temperature.

However, a conventional $Ag_2O—V_2O_5—TeO_2$-based glass composition has an increased tendency to crystallize during calcination and cannot obtain good softening fluidity.

Further, when the $Ag_2O—V_2O_5—TeO_2$-based lead-free glass composition is applied to tempered glass used for a home appliance, etc., a coefficient of thermal expansion of the composition may not match that of the tempered glass, and a low temperature calcination is difficult, and a glass annealing phenomenon may occur.

Further, the coefficient of thermal expansion of the $Ag_2O—V_2O_5—TeO_2$-based lead-free glass composition is not matched with that of a glass substrate such that separation or breakage phenomenon may occur even though a calcination is possible at a low temperature.

DETAILED DESCRIPTION

The above-mentioned objects, features, and advantages will be described below in detail, and accordingly, those skilled in the art will easily perform the technical idea of this application. In describing this application, when it is determined that a detailed description of the known art related to this application may unnecessarily obscure the gist of this application, a detailed description will be omitted. Hereinafter, the preferred embodiments according to this application will be described in detail.

This application is not limited to the disclosed embodiments below but it may be embodied in many different forms from each other, and the present embodiment is merely provided so that the disclosure of this application is complete, and will fully notify the scope of this application to those skilled in the art.

Hereinafter, a lead-free low temperature calcined glass frit, paste, and a vacuum glass assembly using the same according to this application will be described in detail.

<A Lead-Free Low Temperature Calcined Glass Frit>

1. A Lead-Free Low Temperature Calcined Glass Frit

A glass frit used as a sealing material generally may have a good fluidity at a low temperature when a property temperature, such as a glass transition point and a softening point, is low; however, when the property temperature is lowered too much, a crystallization tendency becomes greater, and the fluidity at such a low temperature can be degraded.

Further, when a sealing process is applied to glass used for a home appliance or an electronic appliance, there is a breakage problem of the glass, costs of the sealing process may increase, etc., and thus a sealing process should be applied at 400° C. or less. Thus, a glass frit sealing material used in the sealing process should be capable of a calcination at a low temperature. Further, the glass frit sealing material should have a suitable softening fluidity.

Thus, the present inventors have completed a new glass frit capable of calcination at a low temperature and also having a low crystallization tendency.

The glass frit according to this application may include 5 to 25 wt % of $P_2O_5$, 40 to 70 wt % of $V_2O_5$, 5 to 25 wt % of $TeO_2$, 1 to 5 wt % of CuO, 1 to 12 wt % of ZnO, and 1 to 5 wt % of BaO.

$P_2O_5$ may be contained in the range of 5 to 25 wt % in order to lower a calcination temperature of the glass frit and to control a fluidity. When $P_2O_5$ exceeds 25 wt %, there is a problem that a calcination of the glass frit easily becomes difficult, and fluidity is degraded. When $P_2O_5$ is less than 5 wt %, a problem may occur, as a coefficient of thermal expansion (CTE) of the glass frit is increased and an adhesive force with a glass substrate may be lowered.

$V_2O_5$ may have an effect of lowering a softening point while enhancing a durability of a glass frit, and may be contained in the range of 40 to 70 wt % in a glass frit. When $V_2O_5$ exceeds 70 wt %, there is a problem that a calcination of the glass frit becomes difficult. When $V_2O_5$ is less than 40 wt %, the effect of lowering a softening point of the glass frit is difficult to be sufficiently exhibited, and a problem may also occur in a durability of the glass frit.

$TeO_2$ may have an effect of increasing fluidity of a glass frit and may be contained in the range of 5 to 25 wt % in a glass frit. When $TeO_2$ exceeds 25 wt %, it is difficult to sufficiently lower a softening point, so that a calcination may not be made. When $TeO_2$ is less than 5 wt %, a problem may occur, as a vitrification of the glass frit may be difficult depending on a balance relation with other components.

CuO may be contained in the range of 1 to 5 wt % in order to match a CTE of a glass frit with that of a glass substrate and satisfy durability. When CuO exceeds 5 wt %, fluidity of the glass frit may be lowered. When CuO is less than 1 wt %, a required CTE of the glass frit may not be obtained.

ZnO may be contained in the range of 1 to 12 wt % in order to match a CTE of a glass frit with that of a glass substrate and to improve durability. When ZnO exceeds 12 wt %, fluidity of the glass frit is degraded and an adhesive force with a glass substrate may be a problem. When ZnO is less than 1 wt %, a required CTE of the glass frit may not be obtained.

BaO may be contained in the range of 1 to 5 wt % so that a CTE of a glass frit may correspond to that of a glass substrate and to improve durability. When CuO exceeds 5 wt %, fluidity of a glass frit may be lowered. When CuO is less than 1 wt %, a required CTE of the glass frit may not be obtained.

Further, the glass frit according to this application may further include at least one of $Bi_2O_3$, $MnO_2$, $Fe_2O_3$ or $Ag_2O$. At least one of $Bi_2O_3$, $MnO_2$, $Fe_2O_3$ and $Ag_2O$ may be included in 25 wt % or less in order to increase the durability of the glass frit and lower the crystallization tendency of the glass frit. When at least one of $Bi_2O_3$, $MnO_2$, $Fe_2O_3$ or $Ag_2O$ exceeds 25 wt %, it is possible to lower the CTE; however, a sealing performance may be degraded.

Further, the contents of $P_2O_5$, $V_2O_5$, and $TeO_2$ included in the glass frit according to this application is contained so as to satisfy the following relational expression from a viewpoint of a calcination stability related to the crystallization tendency.

[Relational expression]

$$V_2O_5(\text{wt \%})/P_2O_5(\text{wt \%}) < 3.5$$

$$P_2O_5(\text{wt \%}) + TeO_2(\text{wt \%}) > 30$$

As the content of $V_2O_5$ increases, a glass transition point of the glass frit decreases and the temperature at which the sealing can be made may be lowered. However, at the same time, as a crystallization tendency of the glass frit is increased, a ratio in a relation to $P_2O_5$ and $TeO_2$. A composition ratio of the glass frit satisfy all of the above relational expressions.

Further, the glass frit according to this application has a CTE of 80 to $100 \times 10^{-7}/^\circ$ C. with a view toward matching a CTE of the glass frit with that of a glass substrate, and a softening point is 400° C. or less. The CTE corresponds within the range of 80 to $100 \times 10^{-7}/^\circ$ C., so that the glass frit according to this application can reduce an occurrence of an adhesive force degradation to improve a sealing reliability. Further, the glass frit according to this application may have a softening point at 400° C. or less, and thus, a sealing process of the glass substrate may be performed at the low temperature of 400° C. or less.

In addition, the glass frit according to this application has the above-mentioned component system and composition ratio, so that it has an advantageous effect that it can have a low CTE and can lower the softening point even if it does not include or has a minimal content of an inorganic filler.

If necessary, the glass frit according to this application may include a small amount of inorganic filler. The inorganic filler is a crystalline inorganic particle that has a low CTE, and specifically, may use at least one of zirconium phosphate, zirconium phosphate tungstate, zirconium (Zr), lithium oxide-aluminum oxide-silicon dioxide ($Li_2O$—$Al_2O_3$—$SiO_2$), known as LAS glass, beta-eucryptite (LiAl-$SiO_2$), or zirconium tungstate ($Zr(WO_4)_2$).

2. A Lead-Free Low Temperature Calcined Glass Frit Suitable for Tempered Glass

Further, the present inventors completed a new glass frit that is capable of a calcination at a low temperature and has a low crystallization tendency so that it can be particularly applied to a sealing process of tempered glass.

A glass frit according to another embodiment of this application may include 30 to 50 wt % of $V_2O_5$, 30 to 50 wt % of $TeO_2$, 1 to 5 wt % of Cu, 1 to 5 wt % of BaO, 1 to 10 wt % of at least one of $MnO_2$, $Fe_2O_3$, SnO, $MoO_3$ or ZnO, and 5 to 30 wt % of an inorganic filler.

$V_2O_5$ may have an effect of lowering a softening point while enhancing a durability of a glass frit, and may be contained in a range of 30 to 50 wt % in the glass frit. When $V_2O_5$ exceeds 50 wt %, there is a problem that a calcination of the glass frit becomes difficult. When $V_2O_5$ is less than 30 wt %, sufficiently lowering a softening point of the glass frit may be difficult, and durability of the glass frit may be reduced.

$TeO_2$ may have an effect of enhancing fluidity of a glass frit and may be contained in a range of 30 to 50 wt % in the glass frit. When $TeO_2$ exceeds 50 wt %, it may be difficult to sufficiently lower a softening point, so that it may not be calcined. When $TeO_2$ is less than 30 wt %, a vitrification of the glass frit may be difficult according to a balance relation with other components.

CuO may be contained in the range of 1 to 5 wt % in order to match a CTE of a glass frit to that of glass substrate and improve durability. When CuO exceeds 5 wt %, fluidity of the glass frit may be lowered. When CuO is less than 1 wt %, a required CTE of the glass frit may not be obtained.

BaO may be contained in the range of 1 to 5 wt % in order to match a CTE of a glass frit to that of glass substrate and to improve durability. When CuO exceeds 5 wt %, fluidity of the glass frit may be lowered. When CuO is less than 1 wt %, a required CTE of the glass frit may not be obtained.

The glass frit according to another embodiment of this application may include at least one of $MnO_2$, $Fe_2O_3$, SnO, $MoO_3$, or ZnO in the range of 1 to 10 wt %. When at least one of $MnO_2$, $Fe_2O_3$, SnO, $MoO_3$, or ZnO exceeds 10 wt %, it is difficult to match a CTE of the glass frit to that of glass substrate, and durability and fluidity may be problematic. Likewise, when at least one of $MnO_2$, $Fe_2O_3$ SnO, $MoO_3$, or ZnO is less than 1 wt %, matching the CTE of the glass frit to that of glass substrate may be difficult, and a required property (e.g., a required CTE) may not be obtained.

In addition, the glass frit according to another embodiment of this application may include 5 to 30 wt % of an inorganic filler. The inorganic filler may be included in 10 to 20 wt % in order to provide durability and better match the CTE of the glass frit to that of glass substrate. When the inorganic filler exceeds 30 wt %, a sealing performance of the glass frit may be degraded and a problem may occur in water resistance. When the inorganic filler is less than 5 wt %, matching a CTE of the glass frit to that of glass substrate and a low temperature calcination may become difficult.

The inorganic filler according to another embodiment of this application may be a crystalline inorganic particle that has a low CTE, and specifically, may use at least one of zirconium phosphate, zirconium phosphate tungstate, zirconium, $Li_2O$—$Al_2O_3$—$SiO_2$, beta-eucryptite, or zirconium tungstate.

Further, the glass frit according to another embodiment of this application may additionally include at least one of $Ag_2O$ or $Bi_2O_3$, and at least one of $Ag_2O$ and $Bi_2O_3$ may be included in 5 to 20 wt % to enhance the durability of the glass frit and lower the crystallization tendency of the glass frit. If at least one of $Ag_2O$ or $Bi_2O_3$ exceeds 20 wt %, it is possible to lower the CTE; however, the sealing performance may be degraded. When at least one of $Ag_2O$ or $Bi_2O_3$ is less than 5 wt %, matching the CTE and a low temperature calcination may become difficult.

Further, $V_2O_5$ and $TeO_2$ may be included in the glass frit according to another embodiment of this application so as to satisfy the following relational expression with the view toward calcination stability as related to the crystallization tendency.

[Relational expression]

$$V_2O_5(\text{wt \%})/TeO_2(\text{wt \%}) < 1$$

As the content of $V_2O_5$ increases, the glass transition point of the glass frit is lowered, and thus, a temperature at which a sealing can be made may be lowered. At the same time, a crystallization tendency of the glass frit is increased, so a ratio in a relation with $TeO_2$ may be configured accordingly. The glass frit according to this application has a ratio of $V_2O_5$ (wt %) to $TeO_2$ (wt %) of less than 1.

Further, the glass frit according to another embodiment of this application has a CTE of 70 to $90\times10\text{-}7/°$ C. to better match a CTE with that of a tempered glass substrate. The CTE corresponds within the range of 70 to $90\times10\text{-}7/°$ C., and thus, the glass frit according to another embodiment of this application can reduce an occurrence of an adhesion force degradation and improve a sealing reliability.

<Glass Frit Paste>

Next, a glass frit paste according to this application may include 100 parts by weight of the glass frit mentioned above and 10 to 100 parts by weight of an organic vehicle.

When the organic vehicle is less than 20 parts by weight or exceeds 100 parts by weight, an application process may become difficult as a viscosity of paste is too high or too low.

The organic vehicle may include an organic solvent and an organic binder. The organic solvent may use a solvent such as alpha-terpineol ($\alpha$-terpineol) or butyl carbitol. The organic binder may be ethyl cellulose, but is not limited thereto.

<Vacuum Glass Assembly>

A vacuum glass assembly may mean an assembly that includes two or more glass substrates and a vacuum maintained between the two glass substrates. The vacuum glass assembly may be used in a home appliance such as a refrigerator, a microwave, and a washing machine, or in an electronic component in a lot of electronic equipment.

A glass frit according to this application can be used as a sealing material for the vacuum glass assembly.

When applying glass frit paste according to this application as the sealing material, a sealing process is possible at a temperature less than 400° C., which corresponds to a low temperature. Therefore, when the glass frit paste according to this application is applied as the sealing material, it is possible to lower a risk of breakage and a process cost.

The vacuum glass assembly according to this application may include a first glass substrate; a second glass substrate spaced apart to be opposite to the first glass substrate; and a sealing material that is arranged along an edge of the first or second glass substrate and attaches the first and second glass substrates, and seals a space between the first glass and second glass. The sealing material may be formed by being applied with a paste according to this application and calcined.

The first glass substrate and the second glass substrate of this application can be selected according to a requirement of an article (e.g., an appliance) to which the vacuum glass assembly is applied, and are not particularly limited.

However, as another embodiment of this application, the glass frit including 30 to 50 wt % of $V_2O_5$, 30 to 50 wt % of $TeO_2$, 1 to 5 wt % of Cu, 1 to 5 wt % of BaO, 1 to 10 wt % of at least one of $MnO_2$, $Fe_2O_3$, SnO, $MoO_3$, or ZnO, and 5 to 30 wt % of an inorganic filler may be used for the vacuum glass assembly with which a tempered glass is applied.

The vacuum glass assembly with which the tempered glass is applied can generate a tempered annealing phenomenon in the tempered glass when it is exposed to a high temperature heat treatment process such as a sealing process. Accordingly, the vacuum glass assembly with which the tempered glass is applied has a problem that the heat treatment process cannot be applied at the high temperature.

However, when the glass frit paste according to another embodiment of this application is used as the sealing material, the sealing process is possible at a temperature less than 350° C., which corresponds to a low temperature. Therefore, when applying the glass frit paste according to this application as the sealing material, the tempered annealing phenomenon may not occur in the tempered glass applied in the vacuum glass assembly.

The above-mentioned glass frit paste may be used as the sealing material.

Hereinafter, a specific aspect of this application will be described through the embodiment.

<Embodiment and Experimental Example of Lead-Free Low Temperature Calcined Glass Frit>

1. Embodiments and Comparative Examples

<Production of Glass Frit>

A Glass frit that has a composition ratio described in Table 1 below was prepared. The raw materials of each component were sufficiently mixed in a V-mixer or V-blender for 3 hours. Here, barium carbonate ($BaCO_3$) was used as a raw material of BaO, ammonium dihydrogen phosphate ($NH_4H_2PO_4$) was used as a raw material of $P_2O_5$, and the same components as those described in Table 1 were used for the remaining components. A mixed material was sufficiently melted at 800 to 1000° C. for 1 hour and quenched on a quenching roller to obtain a glass cullet.

The glass cullet obtained in the above procedure was grinded for about 1 hour using a jet mill after controlling an initial particle size by a ball mill, and then passed through a 325 mesh sieve (ASTM C285-88) to control a particle size so that a glass powder that did not pass through remained within 1 g.

TABLE 1

| component | Embodiment | | Comparative Example | |
|---|---|---|---|---|
| (wt %) | 1 | 2 | 1 | 2 |
| $P_2O_5$ | 17.3 | 18.2 | 10.4 | 15.6 |
| $V_2O_5$ | 53.3 | 61.3 | 59.8 | 63.9 |
| $MnO_2$ | 0 | 0 | 0 | 0 |
| $Fe_2O_3$ | 0 | 0 | 0 | 0 |
| CuO | 4.3 | 4.5 | 0 | 0 |
| ZnO | 3.2 | 3.4 | 8.0 | 5.0 |
| BaO | 1.8 | 1.9 | 0 | 5.0 |
| $Bi_2O_3$ | 0 | 0 | 0 | 0 |
| $TeO_2$ | 18.3 | 8.8 | 18.2 | 8.0 |
| $Ag_2O$ | 1.8 | 1.9 | 3.6 | 2.5 |

<Paste Preparation>

An organic vehicle was prepared by mixing α-terpineol and Ethyl cellulose in an appropriate ratio, and then mixed with the glass frit prepared in the above in an appropriate ratio to prepare paste. Three roll mills were used for a uniform mixing.

<Preparation of Vacuum Glass Assembly Specimen>

Two glass substrates were provided, and paste according to Embodiments 1 and 2 and Comparative Examples 1 and 2 was applied to an outer portion of each glass substrate to prepare four glass assembly specimens in total. A vacuum evacuation and a sealing process were performed at 400° C. for these glass assemblies. Accordingly, a total of four glass assembly specimens were completed.

2. Experimental Example

The glass frit, the paste, and the specimen prepared in the above Embodiments and Comparative Examples were measured as follows, and the result thereof is described in Table 2.

(1) Glass Transition Temperature (Tg)

A glass transition point was measured at a heating rate of 10° C./min using a TMA instrument (TMA-Q400 TA instrument).

(2) Coefficient of Thermal Expansion (CTE ($\times 10^{-7}$/° C.))

A CTE was measured at a heating rate of 10° C./min using a thermomechanical analyzer instrument (TMA-Q400 TA™ instrument).

(3) Half Ball Temperature

When a glass frit exists in the form of a powder at a heating rate of 10° C./min using a high temperature microscope, the powder was observed after shrinking and when it has a form of a dim-sphere or half ball according to a temperature.

(4) Water Resistance

The specimen were immersed in a constant temperature bath of distilled water at 90° C. and maintained for 48 hours to observe a color change and a weight change of the distilled water. An increase and decrease rate of the weight of less than 1% was shown as 0, and an increase and decrease rate of the weight of 1% or more was shown as X by measuring a weight after immersion.

(5) Calcination Stability

A glass frit powder was filled and hot pressed into a metal mold, and heated to 600° C. at 10° C./min to observe a crystallization or not after calcination. © indicates that crystallization does not occur and a gloss is very good, o indicates that crystallization does not occur and a gloss is good, and X indicates that crystallization occurs and there is no gloss.

TABLE 2

| | Embodiment | | Comparative Example | |
|---|---|---|---|---|
| | 1 | 2 | 1 | 2 |
| Glass transition temperature (° C.) | 299.1 | 286 | 264.5 | 279.1 |
| Coefficient of thermal expansion (CTE($\times 10^{-7}$/° C.)) | 90 | 88.3 | 110 | 95 |
| Half Ball temperature (° C.) | 380 | 360 | 420 | 430 |
| Evaluation of water resistance | ○ | ○ | X | X |
| Evaluation of calcination stability | ◎ | ○ | X | X |

As described in Table 2, in the embodiment according to this application, it is possible to confirm that a temperature of a half ball form corresponds to 400° C. or less and a calcination is possible at a low temperature. A CTE corresponds to 90 to 100 and is matched with that of a glass material. A water resistance and a calcination stability are excellent.

The above Comparative Examples are for a glass frit that has a $P_2O_5$—$V_2O_5$—$TeO_2$ component system, and such comparative examples have been confirmed that a water resistance and a calcination stability is unsatisfactory, as a softening point is high and a sealing is not properly made compared to the embodiment.

<Embodiments and Experimental Examples of Lead-Free Low Temperature Calcined Glass Frit Suitable for Tempered Glass>

1. Embodiments and Comparative Examples

<Preparation of Glass Frit>

A glass frit that has a composition ratio described in Table 3 below was prepared. The raw materials of each component were thoroughly mixed in a V-mixer for 3 hours. Here, barium carbonate ($BaCO_3$) was used as a raw material of BaO, and the same components as those described in Table 3 were used for the remaining components. A mixed material was sufficiently melted at 800 to 1000° C. for 1 hour and quenched on a quenching roller to obtain a glass cullet.

The glass cullet obtained in the above procedure was grinded for about 1 hour using a jet mill after controlling an initial particle size with a ball mill, and then passed through a 325 mesh sieve (ASTM C285-88) to control the particle size so that a glass powder that did not pass through remained within 1 g.

The glass cullet thus obtained and a filler according to a content described in Table 3 below were combined and mixed with a ball mill for 2 hours to finally prepare a glass frit.

(4) Water Resistance

The specimen was held in a constant temperature bath of distilled water at 90° C., and maintained for 48 hours to observe a color change and a weight change of distilled water. An increase and decrease rate of a weight less than 1% is shown as 0, and an increase and decrease rate of a weight of 1% or more is shown as X by measuring a weight after immersion.

(5) Calcination Stability

A glass frit powder was filled and hot pressed into a metal mold, and heated to 600° C. at a rate of 10° C./min to observe a crystallization or not after calcination. © indicates that crystallization does not occur and a gloss is very good,

TABLE 3

| Component | Embodiment | | | | | Comparative Example | |
|---|---|---|---|---|---|---|---|
| (wt %) | 3 | 4 | 5 | 6 | 7 | 3 | 4 |
| $V_2O_5$ | 35.59 | 31.82 | 31.82 | 33.2 | 35.09 | 24.7 | 53.5 |
| $TeO_2$ | 43.22 | 38.64 | 38.64 | 40.32 | 38.9 | 58.9 | 36.5 |
| CuO | 0.86 | 0.76 | 0.76 | 0.79 | 0.76 | — | — |
| BaO | 1.69 | 1.52 | 1.5 | 1.56 | 1.53 | — | — |
| $MnO_2$ | 0 | 0 | 0 | 0 | 0 | — | — |
| $Fe_2O_3$ | 0 | 0 | 0 | 0 | 0 | — | — |
| ZnO | 3.39 | 3.03 | 3.03 | 3.16 | 3.05 | 5.1 | — |
| $MoO_3$ | 0 | 0 | 0 | 0 | 0 | — | — |
| SnO | 0 | 0 | 0 | 7.91 | 0 | — | — |
| $Bi_2O_3$ | 0 | 7.58 | 0 | 0 | 7.63 | — | — |
| $Ag_2O$ | 0 | 0 | 7.58 | 0 | 0 | 6.89 | 6.05 |
| Filler (Zirconium phosphate) | 15.25 | 16.67 | 16.67 | 13.04 | 13.04 | 4.41 | 3.95 |

<Paste Preparation>

The organic vehicle was prepared by mixing α-terpineol and Ethyl cellulose in an appropriate ratio, and then mixed with a glass frit prepared in the above in an appropriate ratio to prepare paste. Three roll mills were used for uniform mixing.

<Preparation of Vacuum Glass Assembly Specimen>

Two pieces of tempered glass were prepared, and a paste according to Embodiments 3 to 7 and Comparative Examples 3 and 4 was applied to an outer portion of each tempered glass to prepare seven glass assembly specimens in total. A vacuum evacuation and a sealing process were performed at 350° C. for these glass assemblies. Accordingly, a total of seven glass assembly specimens were completed.

2. Experimental Example

The glass frit, the paste, and the specimen prepared in the above Embodiments and Comparative Examples were measured as described below, and the result thereof is described in Table 4.

(1) Glass Transition Temperature (Tg)

A glass transition point was measured at a heating rate of 10° C./min using a TMA instrument (TMA-Q400 TA™ instrument).

(2) Coefficient of Thermal Expansion (CTE (x $10^{-7}$/° C.))

A CTE was measured at a heating rate of 10° C./min by using a TMA instrument (TMA-Q400 TA™ instrument).

(3) Half Ball Temperature

When a glass frit exists in a form of powder at a heating rate of 10° C./min by using a high temperature microscope, it was observed after shrinking and when it has a Half Ball form according to a temperature.

o indicates that crystallization does not occur and a gloss is good, and X indicates that crystallization occurs and there is no gloss.

TABLE 4

| | Embodiment | | | | | Comparative Example | |
|---|---|---|---|---|---|---|---|
| | 3 | 4 | 5 | 6 | 7 | 3 | 4 |
| Glass transition temperature (° C.) | 269.3 | 272 | 259.5 | 264.2 | 273.1 | 257.1 | 261.5 |
| Coefficient of thermal expansion (CTE(x$10^{-7}$/° C.)) | 82.2 | 82 | 83.3 | 81 | 82.1 | 88 | 90 |
| Half Ball temperature (° C.) | 340 | 340 | 330 | 350 | 330 | 420 | 400 |
| Evaluation of water resistance | ○ | ○ | ○ | ○ | ○ | X | X |
| Evaluation of calcination stability | ◎ | ○ | ◎ | ○ | ◎ | X | X |

As described in Table 4, in the embodiment according to this application, it is possible to confirm that a half ball temperature corresponds to 340° C. or less, so that a calcination is possible at a low temperature, and a CTE corresponds to 80 to 85, which is matched with that of a tempered glass substrate. A water resistance and a calcination stability are excellent.

The above Comparative Examples are for a glass frit that has an $Ag_2O$—$V_2O_5$—$TeO_2$ component system, and it is confirmed that such comparative examples of a glass frit are unsatisfactory in water resistance and calcination stability since they have a high softening point, and a sealing is not properly made as compared with the embodiment.

While this application has been described hereinabove, this application is not limited by the embodiment disclosed in the present specification, and it is apparent that various changes can be made by those skilled in the art within the scope of the technical idea of this application. In addition, although the embodiment is not described by explicitly describing the working effect according to the configuration of this application while describing the embodiment of this application in the above, it is needless to say that the predictable effect has to be also acknowledged by the corresponding configuration.

TECHNICAL PROBLEM

It is an object of this application to provide a new lead-free low temperature calcined glass frit that is capable of a calcination at a low temperature as a lead-free glass composition that replaces a lead glass composition.

In particular, it is an object of this application to provide a new lead-free low temperature calcined glass frit that is capable of a calcination at a low temperature and also has a composition ratio such that a crystallization tendency is low even during a low temperature calcination.

Further, it is an object of this application to provide a lead-free low temperature calcined glass frit having a coefficient of thermal expansion that is matched with that of a glass substrate, so that a separation or breaking phenomenon does not occur and a durability is excellent.

TECHNICAL SOLUTION

In order to provide a new lead-free glass frit that is capable of calcination at a low temperature to replace a conventional lead glass composition, a glass frit according to this application may include 5 to 25 weight percent (wt %) of phosphorus pentoxide ($P_2O_5$), 40 to 70 wt % of vanadium pentoxide ($V_2O_5$), 5 to 25 wt % of tellurium dioxide ($TeO_2$), 1 to 5 wt % of copper(II) oxide (CuO), 1 to 12 wt % of zinc oxide (ZnO), and 1 to 5 wt % of barium oxide (BaO).

In addition, in order to provide a glass frit that is capable of calcination at a low temperature and has a low crystallization tendency even during a low temperature calcination, the content of $P_2O_5$, $V_2O_5$, and $TeO_2$ of the glass frit according to this application can satisfy the following relational expression.

[Relational expression]

$$V_2O_5(\text{wt \%})/P_2O_5(\text{wt \%}) < 3.5$$

$$P_2O_5(\text{wt \%}) + TeO_2(\text{wt \%}) > 30$$

Further, in order to provide a glass frit that omits or reduces an amount of an inorganic filler and has a coefficient of thermal expansion of the glass frit matching that of a glass substrate, the glass frit according to this application may further include at least one of bismuth oxide ($Bi_2O_3$), manganese dioxide ($MnO_2$), iron(III) oxide ($Fe_2O_3$), or silver(I) oxide ($Ag_2O$). Such composition may reduce or prevent separation or breakage, improving durability.

Next, in order to provide a new lead-free glass frit that is capable of calcination at low temperatures as that replaces the lead glass composition, the glass frit according to another embodiment of this application may include 30 to 50 wt % of $V_2O_5$, 30 to 50 wt % of $TeO_2$, 1 to 5 wt % of CuO, 1 to 5 wt % of BaO, 1 to 10 wt % of at least one of $MnO_2$, $Fe_2O_3$, stannous oxide or tin(II) oxide (SnO), molybdenum trioxide ($MoO_3$) or ZnO, and 5 to 30 wt % of an inorganic filler.

In addition, in order to provide the lead-free glass frit that is capable of calcination at low temperatures and has a low crystallization tendency at the low temperature calcination, the content of $V_2O_5$ and the content of $TeO_2$ of the glass frit according to another embodiment of this application can satisfy the following relational expression.

[Relational expression]

$$V_2O_5(\text{wt \%})/TeO_2(\text{wt \%}) < 1$$

Further, in order to provide a glass frit having a coefficient of thermal expansion that is matches that of the glass substrate to reduce or prevent separation or breakage and improve durability, even though calcination is possible at the low temperature, according to another embodiment, the inorganic filler may be 10 to 20 wt % of the glass frit, and the coefficient of thermal expansion (CTE) after calcination may be in the range of 70 to 90×10-7/° C.

ADVANTAGEOUS EFFECTS

A glass frit according to this application has a new component system including $P_2O_5$, $V_2O_5$, $TeO_2$, CuO, ZnO, and BaO at a specific composition to replace a lead glass compositions while being capable of a low temperature calcination.

In addition, the glass frit according to this application have ratio of $P_2O_5$, $V_2O_5$, and $TeO_2$ configured such that the glass frit may be capable of a calcination at a low temperature and have a low crystallization tendency even during low temperature calcinations.

Further, the glass frit according to this application may further include at least one of $Bi_2O_3$, $MnO_2$, $Fe_2O_3$ or $Ag_2O$, and may have a coefficient of thermal expansion (CTE) after calcination in the range of 80 to 100×10-7/° C. There is an effect that an inorganic filler is not included or the content of the inorganic filler is reduced, and a CTE of the glass frit is matched with that of a glass substrate to prevent or reduce a separation or breakage phenomenon and improve durability.

Next, the glass frit according to another embodiment of this application has a new composition system including at least one of $V_2O_5$, $TeO_2$, CuO, BaO, $MnO_2$, $FeO_3$, $Fe_2O_3$, SnO, $MoO_3$, or ZnO and an organic filler with a specific composition ratio of this application, and thus, the glass composition may be capable of replacing the lead glass composition, and a calcination is possible at a low temperature of 350° C. or less.

In addition, the glass frit according to another embodiment of this application may have a ratio of $V_2O_5$ and $TeO_2$, such that the composition may be capable of a calcination at a low temperature and have a low crystallization tendency even during a low temperature calcination.

Further, the inorganic filler according to another embodiment of this application may be included in 10 to 20 wt %, and the coefficient of thermal expansion (CTE) after calcination may be in the range of 70 to 90×10-7/° C. The CTE thereof may correspond to that of the glass substrate, so that separation or breakage may not occur and durability is excellent.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A glass frit, consisting of:
30 to 50 weight percent (wt %) of vanadium pentoxide ($V_2O_5$);
30 to 50 wt % of tellurium dioxide ($TeO_2$);
1 to 5 wt % of copper oxide (CuO);
1 to 5 wt % of barium oxide (BaO);
1 to 10 wt % of at least one of manganese dioxide $MnO_2$, $FeO_3$, stannous oxide (SnO), molybdenum trioxide ($MoO_3$), or zinc oxide (ZnO);
5 to 20 wt % of at least one of silver oxide ($Ag_2O$) or bismuth oxide ($Bi_2O_3$); and
5 to 30 wt % of an inorganic filler.

2. The glass frit of claim 1, wherein $V_2O_5$ (wt %)/$TeO_2$ (wt %)<1.

3. The glass frit of claim 1, wherein a wt % of the inorganic filler is 10 to 20 wt %.

4. The glass frit of claim 1, wherein a coefficient of thermal expansion (CTE) after calcination is in a range of 70 to $90\times10^{-7}$/° C.

5. A glass frit paste of claim 1, comprising 100 parts by weight of the glass frit, and 10 to 100 parts by weight of an organic vehicle.

6. A vacuum glass assembly formed with the glass frit paste of claim 5, comprising:
a first glass substrate;
a second glass substrate spaced apart from and facing the first glass substrate such that a space is formed between the first and second glass substrates; and
a sealing material formed with the glass frit paste and provided at an edge of the first or second glass substrate to attach the first and second glass substrates and seal the space between the first glass substrate and the second glass substrate, wherein the sealing material is calcined.

* * * * *